(12) United States Patent
Michels

(10) Patent No.: US 8,880,632 B1
(45) Date of Patent: *Nov. 4, 2014

(54) METHOD AND APPARATUS FOR PERFORMING MULTIPLE DMA CHANNEL BASED NETWORK QUALITY OF SERVICE

(75) Inventor: Tim S. Michels, Greenacres, WA (US)

(73) Assignee: F5 Networks, Inc., Seattle, WA (US)

( * ) Notice: Subject to any disclaimer, the term of this patent is extended or adjusted under 35 U.S.C. 154(b) by 63 days.

This patent is subject to a terminal disclaimer.

(21) Appl. No.: 12/686,809

(22) Filed: Jan. 13, 2010

Related U.S. Application Data

(60) Provisional application No. 61/205,388, filed on Jan. 16, 2009.

(51) Int. Cl.
*G06F 15/167* (2006.01)

(52) U.S. Cl.
USPC .............. 709/212; 710/22; 370/412; 370/235

(58) Field of Classification Search
USPC .................. 709/212–216, 250–252; 370/235
See application file for complete search history.

(56) References Cited

U.S. PATENT DOCUMENTS

| | | | |
|---|---|---|---|
| 5,388,237 A | 2/1995 | Sudos | |
| 5,761,534 A | 6/1998 | Lundberg et al. | |
| 5,828,835 A | 10/1998 | Isfeld et al. | |
| 5,941,988 A | 8/1999 | Bhagwat et al. | |
| 6,026,443 A | 2/2000 | Oskouy et al. | |
| 6,115,802 A | 9/2000 | Tock et al. | |
| 6,529,508 B1 | 3/2003 | Li et al. | |
| 6,700,871 B1 | 3/2004 | Harper et al. | |
| 6,748,457 B2 | 6/2004 | Fallon et al. | |
| 6,781,990 B1 | 8/2004 | Puri et al. | |
| 6,820,133 B1 | 11/2004 | Grove et al. | |
| 7,065,630 B1 | 6/2006 | Ledebohm et al. | |
| 7,107,348 B2 | 9/2006 | Shimada et al. | |
| 7,142,540 B2 | 11/2006 | Hendel et al. | |
| 7,236,491 B2 | 6/2007 | Tsao et al. | |
| 7,281,030 B1 | 10/2007 | Davis | |
| 7,324,525 B2 | 1/2008 | Fuhs et al. | |
| 7,355,977 B1 | 4/2008 | Li | |
| 7,376,772 B2 | 5/2008 | Fallon | |

(Continued)

FOREIGN PATENT DOCUMENTS

| | | |
|---|---|---|
| EP | 1813084 A1 | 8/2007 |
| WO | 2006/055494 A1 | 5/2006 |

OTHER PUBLICATIONS

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

(Continued)

*Primary Examiner* — Greg C Bengzon
(74) *Attorney, Agent, or Firm* — LeClairRyan, a Professional Corporation

(57) ABSTRACT

A method and apparatus for handling packets received from a server over a network based upon quality of network service on DMA channels includes inspecting a packet received by a network device, classifying the inspected packet with the network device based on one or more class of service identifiers in the packet, assigning with the network device the classified packet to one of a plurality of DMA rings associated with a DMA channel based on the one or more class of service identifiers in the packet, and moving the assigned packet to a host memory based upon the assigning.

18 Claims, 5 Drawing Sheets

(56) References Cited

U.S. PATENT DOCUMENTS

| | | | |
|---|---|---|---|
| 7,403,542 B1 | 7/2008 | Thompson | |
| 7,420,931 B2 | 9/2008 | Nanda et al. | |
| 7,478,186 B1 | 1/2009 | Onufryk et al. | |
| 7,496,695 B2* | 2/2009 | Go et al. | 710/22 |
| 7,500,028 B2* | 3/2009 | Yamagishi | 710/22 |
| 7,512,721 B1 | 3/2009 | Olson | |
| 7,533,197 B2 | 5/2009 | Leonard et al. | |
| 7,558,910 B2 | 7/2009 | Alverson et al. | |
| 7,571,299 B2 | 8/2009 | Loeb | |
| 7,647,416 B2 | 1/2010 | Chiang et al. | |
| 7,657,659 B1 | 2/2010 | Lambeth et al. | |
| 7,668,727 B2 | 2/2010 | Mitchell et al. | |
| 7,668,851 B2 | 2/2010 | Triplett | |
| 7,729,239 B1 | 6/2010 | Aronov et al. | |
| 7,734,809 B2 | 6/2010 | Joshi et al. | |
| 7,735,099 B1 | 6/2010 | Micalizzi, Jr. | |
| 7,742,412 B1 | 6/2010 | Medina | |
| 7,784,093 B2 | 8/2010 | Deng et al. | |
| 7,826,487 B1 | 11/2010 | Mukerji et al. | |
| 7,877,524 B1 | 1/2011 | Annem et al. | |
| 7,916,728 B1 | 3/2011 | Mimms | |
| 8,006,016 B2 | 8/2011 | Muller et al. | |
| 8,103,809 B1 | 1/2012 | Michels et al. | |
| 8,112,491 B1 | 2/2012 | Michels et al. | |
| 8,112,594 B2 | 2/2012 | Giacomoni et al. | |
| 8,279,865 B2 | 10/2012 | Giacomoni et al. | |
| 2002/0143955 A1 | 10/2002 | Shimada et al. | |
| 2003/0067930 A1 | 4/2003 | Salapura et al. | |
| 2003/0204636 A1 | 10/2003 | Greenblat et al. | |
| 2004/0202161 A1 | 10/2004 | Stachura et al. | |
| 2004/0249948 A1 | 12/2004 | Sethi et al. | |
| 2004/0267897 A1 | 12/2004 | Hill et al. | |
| 2005/0007991 A1 | 1/2005 | Ton et al. | |
| 2005/0083952 A1 | 4/2005 | Swain | |
| 2005/0114559 A1 | 5/2005 | Miller | |
| 2005/0175014 A1 | 8/2005 | Patrick | |
| 2005/0213570 A1 | 9/2005 | Stacy et al. | |
| 2006/0007928 A1 | 1/2006 | Sangillo | |
| 2006/0104303 A1 | 5/2006 | Makineni et al. | |
| 2006/0221832 A1* | 10/2006 | Muller et al. | 370/235 |
| 2006/0221835 A1 | 10/2006 | Sweeney | |
| 2006/0235996 A1 | 10/2006 | Wolde et al. | |
| 2006/0288128 A1 | 12/2006 | Moskalev et al. | |
| 2008/0126509 A1 | 5/2008 | Subramanian et al. | |
| 2008/0184248 A1 | 7/2008 | Barua et al. | |
| 2009/0003204 A1 | 1/2009 | Okholm et al. | |
| 2009/0016217 A1* | 1/2009 | Kashyap | 370/231 |
| 2009/0089619 A1 | 4/2009 | Huang et al. | |
| 2009/0222598 A1 | 9/2009 | Hayden | |
| 2009/0248911 A1 | 10/2009 | Conroy et al. | |
| 2010/0082849 A1 | 4/2010 | Millet et al. | |
| 2010/0094945 A1 | 4/2010 | Chan et al. | |
| 2012/0191800 A1 | 7/2012 | Michels et al. | |
| 2014/0032695 A1 | 1/2014 | Michels et al. | |

OTHER PUBLICATIONS http://lwn.net/images/pdf/LDD3/ch15.pdf, "Memory Mapping and DMA," Chapter 15, pp. 412-463 (Jan. 2005).
Eventhelix.com, "DMA and Interrupt Handling," at http://www.eventhelix.com/RealtimeMantra/FaultHandling/dma_interrupt_handling.htm (Downloaded Oct. 2009).
Eventhelix.com, "TCP—Transmission Control Protocol (TCP Fast Retransmit and Recovery)," (Mar. 2002).
Harvey, "DMA Fundamentals on Various PC Platforms," National Instruments, Application Note 011, pp. 1-18 (Apr. 1991).
Mangino, "Using DMA with High Performance Peripherals to Maximize System Performance," WW TMS470 Catalog Applications, at http://focus.ti.com/lit/wp/spna105/spna105.pdf (Jan. 2007).
Mogul, "The Case for Persistent-Connection HTTP," SIGCOMM, Cambridge, MA USA pp. 299-313 (Oct. 1995).
Rabinovich et al., "DHTTP: An Efficient and Cache-Friendly Transfer Protocol for the Web," IEEE/ACM Transactions on Networking 12(6):1007-20 (Dec. 2004).
Stevens, "TCP Slow Start, Congestion Avoidance, Fast Retransmit, and Fast Recovery Algorithms," Standards Track Memo pp. 1-6 (Jan. 1997).
Wadge, "Achieving Gigabit Performance on Programmable Ethernet Network Interface Cards," pp. 1-9 (May 2001).
Welch, "A User's Guide to TCP Windows," pp. 1-5 (Jun. 1996).
Wikipedia, "Direct Memory Access," at http://en.wikipedia.org/wiki/Direct_memory_access, pp. 1-6 (Downloaded Oct. 2009).
Wikipedia, "Nagle's Algorithm," at Nagle's Algorithm—Wikeopedia.xps (Last Modified Oct. 2009).
Salchow, Jr., KJ, "Clustered Multiprocessing: Changing the Rules of the Performance Game," F5 White Paper, Jan. 2008, pp. 1-11, F5 Networks, Inc.
U.S. Appl. No. 12/613,783, filed Nov. 6, 2009, entitled "Handling High Throughput and Low Latency Network Data Packets in a Traffic Management Device," Inventor T. Michels et al.
U.S. Appl. No. 12/685,901, filed Jan. 12, 2010, entitled "Methods for Sharing Bandwidthacross a Packetized Buss and Systems Thereof," Inventor T. Michels.
U.S. Appl. No. 12/689,832, filed Jan. 19, 2010, entitled "Network Devices With Multiple Fully Isolated and Independently Resettable Direct Memory Access Channels and Methods Thereof," Inventor T. Michaels et al.
U.S. Appl. No. 13/397,290, filed Feb. 15, 2012, entitled "Methods for Managing User Information and Devices Thereof," Inventor Jain et al.
U.S. Appl. No. 13/732,337, filed Dec. 31, 2012, entitled "Transmit Rate Pacing of Large Network Traffic Bursts to Reduce Jitter, Buffer Overrun, Wasted Bandwidth, and Retransmissions," Inventor T. Michels et al.
"Cavium Networks Product Selector Guide—Single & Multi-Core MIPS Processors, Security Processors and Accelerator Boards," Spring 2008, pp. 1-44, Cavium Networks, Mountain View, CA, US.
"Comtech AHA Announces 3.0 Gbps GZIP Compression/Decompression Accelerator—AHA362-PCIX offers high-speed GZIP compression and decompression," www.aha.com, Apr. 20, 2005, pp. 1-2, Comtech AHA Corporation, Moscow, ID, USA.
"Comtech AHA Announces GZIP Compression and Decompression IC—Offers the highest speed and compression ratio performance in hardware on the market," www.aha.com, Jun. 26, 2007, pp. 1-2, Comtech AHA Corporation, Moscow, ID, USA.
"Gigabit Ethernet/PCI Network Interface Card; Host/NIC Software Interface Definition," Jul. 1999, pp. 1-80, Revision Dec. 4, 2013, P/N 020001, Alteon WebSystems, Inc., San Jose, California.
"Nitrox™ XL Security Acceleration Modules—PCI 3V or 3V/5V—Universal Boards for SSL and IPSec," at http://www.Caviumnetworks.com, (2002) pp. 1, Cavium Networks, Mountain View, CA USA.
"PCI, PCI-X," at http://www.cavium.com/acceleration_boards_PCI_PCI-X.htm, downloaded Oct. 2008, Cavium Networks—Products > Acceleration Boards > PCI, PCI-X.
"Plan 9 kernel history: overview / file list / diff list," <http://switch.com/cgi-bin/plan9history.cgi?f=2001/0126/pc/etherga620.com>, accessed Oct. 22, 2007, pp. 1-16.

* cited by examiner

METHOD AND APPARATUS FOR PERFORMING MULTIPLE DMA CHANNEL BASED NETWORK QUALITY OF SERVICE

PRIORITY CLAIM

This application claims the benefit of U.S. Provisional Patent Application Ser. No. 61/205,388, filed on Jan. 16, 2009, entitled "Methods and System for Multiple DMA Channel Based Network Quality of Service," which is hereby incorporated by reference in its entirety.

TECHNOLOGICAL FIELD

This technology generally relates to optimizing network traffic, and more particularly, to apparatuses and methods for using multiple DMA channels and multiple quality of service rings for DMA channels to optimize network traffic.

BACKGROUND

The use of server-based applications by remote clients over a network has become ubiquitous. With the widespread use of such diverse server applications, client devices have differing needs with respect to processing data received from or transmitted over a network. Network interface controllers are components that allow network devices to transmit and receive data over a network. Currently, network interface controllers present all network data to the network device host processing systems as a single stream of packets. The packets are presented in the order they are received without any discrimination. This results in network inefficiencies because of the mixed nature of network data when considered from the viewpoint of application software running on the network device host processing systems.

SUMMARY

One example in the present disclosure is a method for handling packets received from a server over a network based upon quality of network service on DMA channels. The method includes inspecting a packet received by a network device, classifying the inspected packet with the network device based on one or more class of service identifiers in the packet, assigning with the network device the classified packet to one of a plurality of DMA rings associated with a DMA channel based on the one or more class of service identifiers in the packet, and moving the assigned packet to a host memory based upon the assigning.

Another example includes a computer readable medium having stored thereon instructions for handling packets received from a server over a network based upon quality of network service on DMA channels, which when executed by at least one processor, causes the processor to perform a number of steps. The steps include inspecting a packet received by a network device, classifying the inspected packet with the network device based on one or more class of service identifiers in the packet, assigning with the network device the classified packet to one of a plurality of DMA rings associated with a DMA channel based on the one or more class of service identifiers in the packet, and moving the assigned packet to a host memory based upon the assigning.

Another example is that of an application delivery controller apparatus, which includes one or more processors executing one or more traffic management applications, a memory, a network interface controller coupled to the one or more processors and the memory and configured to receive data packets from a network that relate to the executing traffic management applications. In this example, at least one of the one or more processors and the network interface controller include logic capable of being further configured to inspect a packet received by a network device, classify the inspected packet with the network device based on one or more class of service identifiers in the packet, assign with the network device the classified packet to one of a plurality of DMA rings associated with a DMA channel based on the one or more class of service identifiers in the packet, and move the assigned packet to a host memory based upon the assigning.

According to another example, a method for handling packets to be transmitted to a server over a network based upon quality of network service on DMA channels includes determining at a network traffic management device one or more class of service identifiers associated with a packet stored in the network traffic management device, assigning the packet to one of a plurality of DMA rings associated with a DMA channel based on the one or more class of service identifiers determined for the packet, and transmitting the assigned packet to a network using the DMA channel based upon the one or more class of service identifiers.

In another example, a computer readable medium having stored thereon instructions for handling packets to be transmitted to a server over a network based upon quality of network service on DMA channels, which when executed by at least one processor, causes the processor to perform a number of steps. The steps include determining at a network traffic management device one or more class of service identifiers associated with a packet stored in the network traffic management device, assigning the packet to one of a plurality of DMA rings associated with a DMA channel based on the one or more class of service identifiers determined for the packet, and transmitting the assigned packet to a network using the DMA channel based upon the one or more class of service identifiers.

In yet another example, a network traffic management apparatus (e.g., an application delivery controller) includes one or more processors executing one or more traffic management applications, a memory, a network interface controller coupled to the one or more processors and the memory and configured to transmit data packets to a network based upon quality of network service on DMA channels. In this example, at least one of the one or more processors and the network interface controller include logic capable of being further configured to determine at a network traffic management device one or more class of service identifiers associated with a packet stored in the network traffic management device, assigning the packet to one of a plurality of DMA rings associated with a DMA channel based on the one or more class of service identifiers determined for the packet, and transmitting the assigned packet to a network using the DMA channel based upon the one or more class of service identifiers.

The examples offer numerous advantages. For example, network packets can be received and transmitted based upon their class of service, and not simply based upon the order in which they are received or created. In one example, high priority packets belonging to an application are processed before packets associated with a high bandwidth application. In another example, packets associated with management traffic within a network device, e.g., an application delivery controller, or other traffic are processed before the outside network traffic that includes data, thereby enabling the network device to ensure robust internal performance. Another example advantage is in a denial of service attack scenario where the network traffic management device can continue to provide service to packets associated with already authenticated and open sessions at a higher priority than new packets that are requesting that a new session be established. By utilizing the quality or class of service identifier(s) in the open session packets, the network device can continue to provide service to the users even under unfavorable conditions of a denial of service where a large number of disruptive request packets are received by the network device for starting new sessions. Thus, the examples disclosed are advantageous in differentiating legitimate open session packets from malicious new session packets, and prevent and/or obstruct a pending denial of service attack. These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive.

DETAILED DESCRIPTION

Currently, network data packets destined to servers in a network are handled by network interface controllers arranged in network traffic management devices in a sequential order, i.e., the order the packets were received by such devices. This prevents server applications running on servers managed by such network traffic management devices from receiving needed packets in a timely manner. Further, higher priority packets are often denied service by the network traffic management devices because they are grouped with lower priority packets by the network interface controller. As such, the application delivery controller 110 shown in FIG. 1A addresses these issues and offers additional utility that will become apparent from the ensuing descriptions below.

Figure 1A:
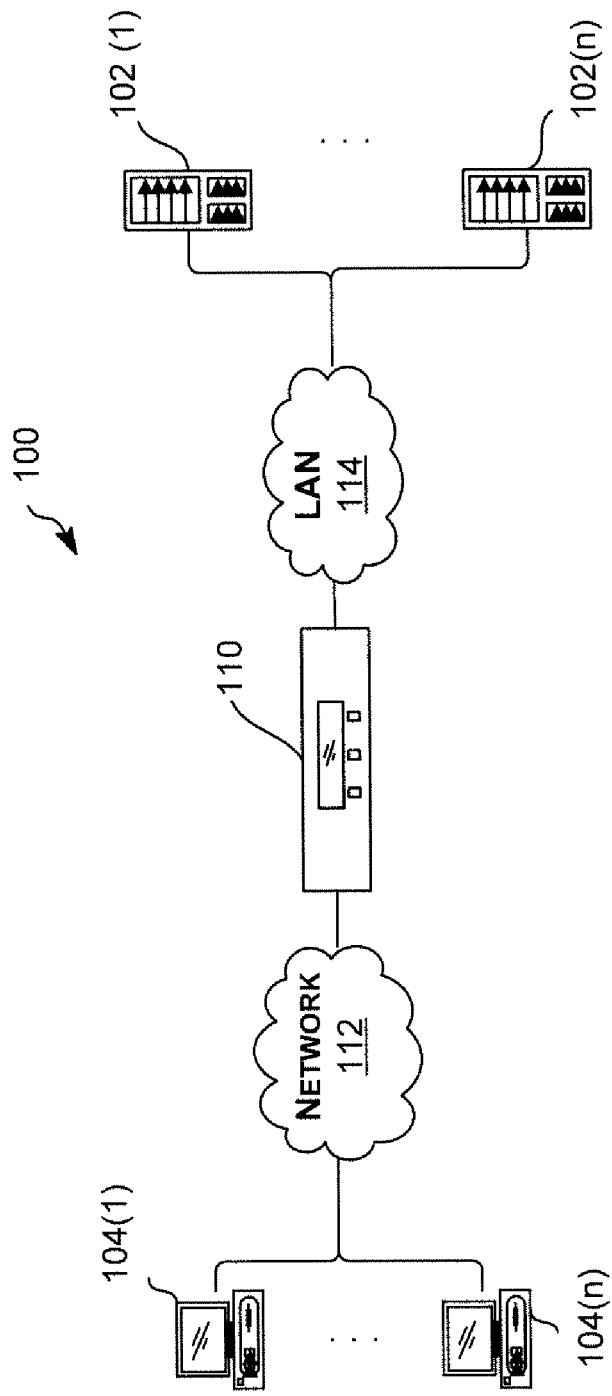
FIG. 1A is an exemplary network environment using a multiple DMA channel based application delivery controller to manage network data packets.

FIG. 1A depicts an exemplary network system 100 using a multiple DMA channel based application delivery controller 110 that can provide multiple DMA channels and increase network quality of service for packets with connection state to servers 102(1) to 102(n) and can allow processing packets on a priority determined based on classification of service. A network 112 can provide responses and requests according to the HTTP-based application request for comments (RFC) protocol or the Common Internet File System (CIFS) or network file system (NFS) protocol in this example, but the principles discussed herein are not limited to these examples and can include other application protocols. The system 100 can include a series of one or more client devices such as client computers 104(1) to 104(n) (also interchangeably referred to as client device, client computing devices, and client computing systems), and an application delivery controller 110 coupling the servers 102(1) to 102(n) to the client devices 104(1) to 104(n) through the network 112. For clarity and brevity, in FIG. 1A two server devices 102(1) and 102(n) are shown, but it should be understood that any number of server devices can use the exemplary network system 100. Likewise, two client devices 104(1)-104(n) are shown in FIG. 1A, but any number of client devices can also use the exemplary network system 100 as well. The ellipses and the designation "n" denote an unlimited number of server devices and client devices, respectively.

Servers 102(1)-102(n) comprise one or more server computing machines capable of operating one or more Web-based applications that may be accessed by network devices in the network 112, such as client devices 104(1)-104(n) (also referred to as client computers 104(1)-104(n)), via application delivery controller 110, and may provide other data representing requested resources, such as particular Web page(s), image(s) of physical objects, and any other objects, responsive to the requests, although the servers 102(1)-102(n) may perform other tasks and provide other types of resources. It should be noted that while only two servers 102(1) and 102(n) are shown in the network system 100 depicted in FIG. 1A, other numbers and types of servers may be coupled to the application delivery controller 110. It is also contemplated that one or more of the servers 102(1)-102(n) may be a cluster of servers managed by a network traffic management device such as application delivery controller 110.

The client computers 104(1)-104(n) in this example can run interface applications such as Web browsers that can provide an interface to make requests for and send data to different Web server-based applications via the network 112. A series of applications can run on the servers 102(1)-102(n) that allow the transmission of data that is requested by the client computers 104(1)-104(n). The servers 102(1)-102(n) can provide data or receive data in response to requests directed toward the respective applications on the servers 102(1)-102(n) from the client computers 104(1)-104(n). As per the TCP, packets can be sent to the servers 102(1)-102(n) from the requesting client computers 104(1)-104(n) to send data. It is to be understood that the servers 102(1)-102(n) can be hardware or software or can represent a system with multiple servers, which can include internal or external networks. In this example the servers 102(1)-102(n) can be any version of Microsoft® IIS servers or Apache® servers, although other types of servers can be used. Further, additional servers can be coupled to the network 112 and many different types of applications can be available on servers coupled to the network 112.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run Web browsers that can provide an interface to make requests to different Web server-based applications via the network 112. A series of Web-based applications can run on the application servers 102(1)-

102(*n*) that allow the transmission of data that is requested by the client computers 104(1)-104(*n*). The client computers 104(1)-104(*n*) can be further configured to engage in a secure communication with the application delivery controller 110 and/or the servers 102(1)-102(*n*) using mechanisms such as Secure Sockets Layer (SSL), Internet Protocol Security (IPSec), Tunnel Layer Security (TLS), and the like.

In this example, the network 112 comprises a publicly accessible network, such as the Internet, which includes client computers 104(1)-104(*n*), although the network 112 may comprise other types of private and public networks that include other devices. Communications, such as requests from client computers 104(1)-104(*n*) and responses from servers 102(1)-102(*n*), take place over the network 112 according to standard network protocols, such as the HTTP and TCP/IP protocols in this example, but the principles discussed herein are not limited to this example and can include other protocols. Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 112 includes any communication medium and method by which data may travel between client devices 104(1)-104(*n*), servers 102(1)-102(*n*) and application delivery controller 110, and these examples are provided by way of example only.

Each of the servers 102(1)-102(*n*), application delivery controller 110, and client computers 104(1)-104(*n*) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system 100. Accordingly, principles and advantages of distributed processing, such as redundancy, replication, and the like, also can be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

LAN 114 comprises a private local area network that includes the application delivery controller 110 coupled to the one or more servers 102(1)-102(*n*), although the LAN 114 may comprise other types of private and public networks with other devices. Networks, including local area networks, besides being understood by those skilled in the relevant arts, have already been generally described above in connection with network 112, and thus will not be described further here.

As shown in the example environment of network system 100 depicted in FIG. 1A, the application delivery controller 110 can be interposed between the network 112 and the servers 102(1)-102(*n*) in LAN 114 as shown in FIG. 1A. Again, the network system 100 could be arranged in other manners with other numbers and types of devices. Also, the application delivery controller 110 is coupled to network 112 by one or more network communication links and intermediate network devices, such as routers, switches, gateways, hubs and other devices (not shown). It should be understood that the devices and the particular configuration shown in FIG. 1A are provided for exemplary purposes only and thus are not limiting.

Generally, the application delivery controller 110 manages network communications, which may include one or more client requests and server responses, from/to the network 112 between the client devices 104(1)-104(*n*) and one or more of the servers 102(1)-102(*n*) in LAN 114 in these examples. These requests may be destined for one or more servers 102(1)-102(*n*), and, as alluded to earlier, may take the form of one or more TCP/IP data packets originating from the network 108, passing through one or more intermediate network devices and/or intermediate networks, until ultimately reaching the application delivery controller 110, for example. In any case, the application delivery controller 110 may manage the network communications by performing several network traffic management related functions involving the communications, such as load balancing, access control, VPN hosting, network traffic acceleration, and applying quality of service levels to multiple direct memory access channels in accordance with the processes described further below in connection with FIGS. 1B-3B, for example.

Figure 1B:
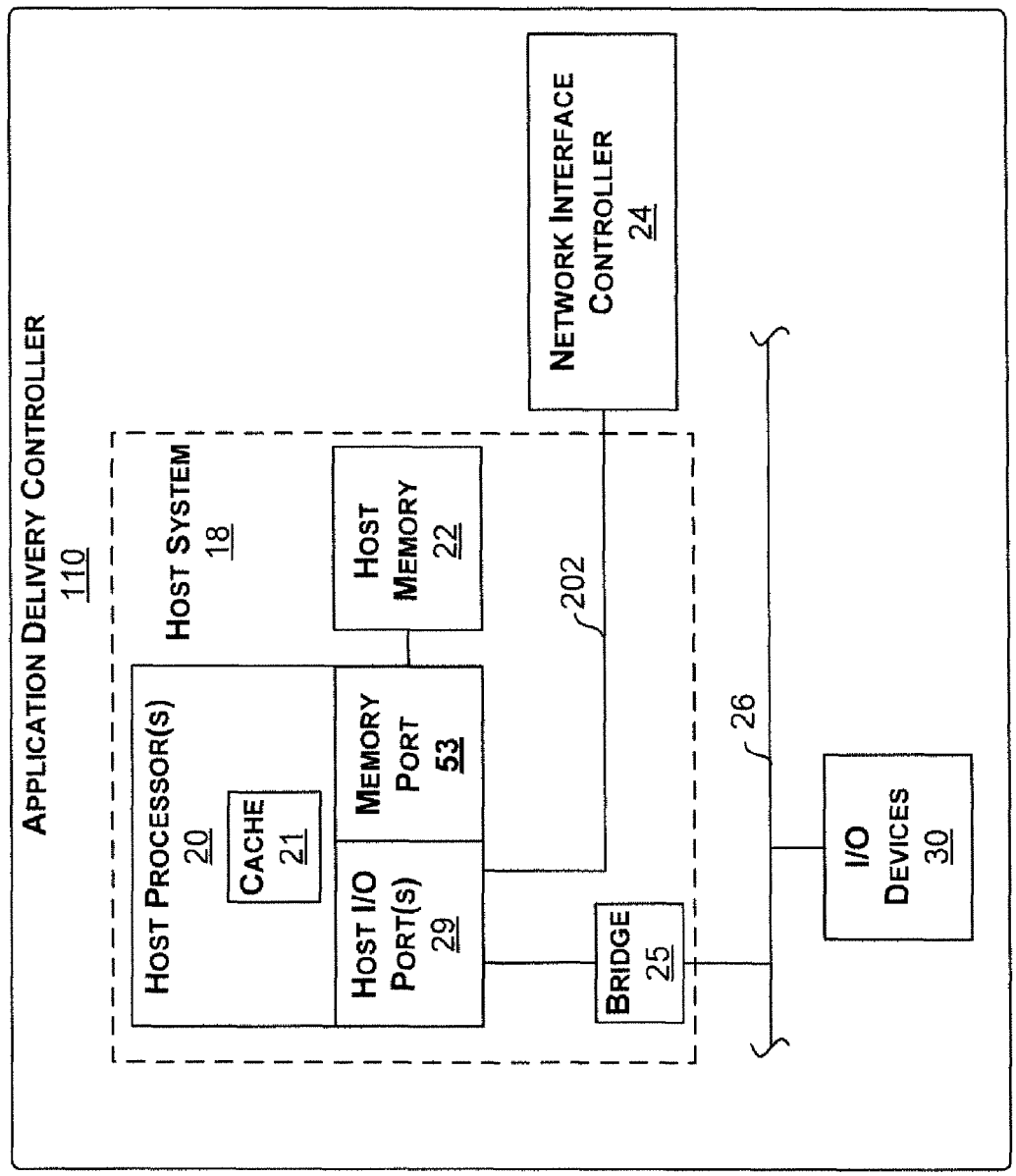
FIG. 1B is a block diagram of an application delivery controller in the exemplary network environment.

FIG. 1B illustrates an example application delivery controller 110. Included within the application delivery controller 110 is a system bus 26 (also referred to as bus 26) that communicates with a host system 18 via a bridge 25 and with an I/O device 30. In this example, a single I/O device 30 is shown to represent any number of I/O devices connected to bus 26. In one example, bridge 25 is in further communication with a host processor 20 via host I/O ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately).

In one example, application delivery controller 110 can include the host processor 20 characterized by anyone of the following component configurations: computer readable medium and logic circuits that respond to and process instructions fetched from the host memory 22; a microprocessor unit, such as: those manufactured by Intel Corporation;

those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the application delivery controller 110 include the host processor 20 that communicates with cache memory 21 via a secondary bus also known as a backside bus, while another example of the application delivery controller 110 includes the host processor 20 that communicates with cache memory via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other examples of the application delivery controller 110 include I/O device 30 that is a video display (not shown separately) that communicates with the host processor 20 via an Advanced Graphics Port (AGP).

Still other versions of the application delivery controller 110 include host processor 20 connected to an I/O device 30 via any one of the following connections: HyperTransport, Rapid I/O, or InfiniBand. Further examples of the application delivery controller 110 include a communication connection where the host processor 20 communicates with one I/O device 30 using a local interconnect bus and with a second I/O device (not shown separately) using a direct connection. Included within some examples of the application delivery controller 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Further examples include a host processor 20 that can access the host memory 22 via one of either: system bus 26; memory port 53; or any other connection, bus or port that allows the host processor 20 to access host memory 22.

One example of the application delivery controller 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can, in some examples, include a client agent, or any portion of a client agent. The application delivery controller 110 may further include a storage device (not shown separately) that can be either one or more hard disk drives, or one or more redundant arrays of independent disks; where the storage device is configured to store an operating system, software, programs applications, or at least a portion of the client agent. A further example of the application delivery controller 110 includes an installation device that is used as the storage device.

Furthermore, the application delivery controller 110 may include network interface controller 24 to communicate with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the application delivery controller includes network interface controller 24 able to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCMCIA network card; a card bus network adapter; a wireless network adapter; a USB network adapter; a modem; or any other device suitable for interfacing the application delivery controller 110 to a network capable of communicating and performing the methods and systems described herein.

In various examples, the application delivery controller 110 can include any one of the following I/O devices 30: a keyboard; a pointing device; a mouse; a gesture based remote control device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

Example Receiving Data Packets from the Network (Return DMA Operation)

Figure 2A:
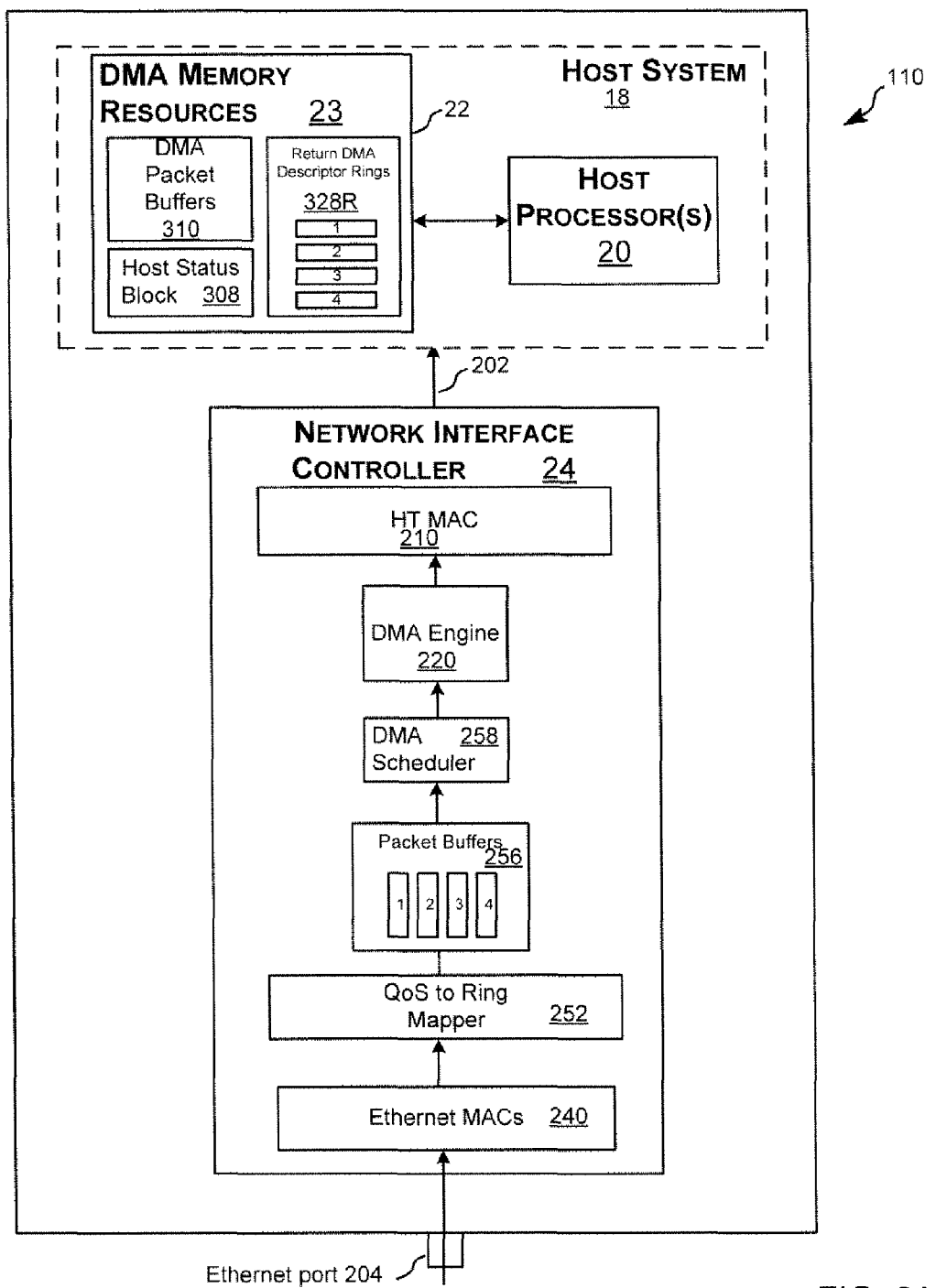
FIG. 2A is a block diagram of a network interface controller and host system that performs a return DMA operation using multiple DMA channels to extend network based QoS to host based QoS in the exemplary network environment.
Figure 2B:
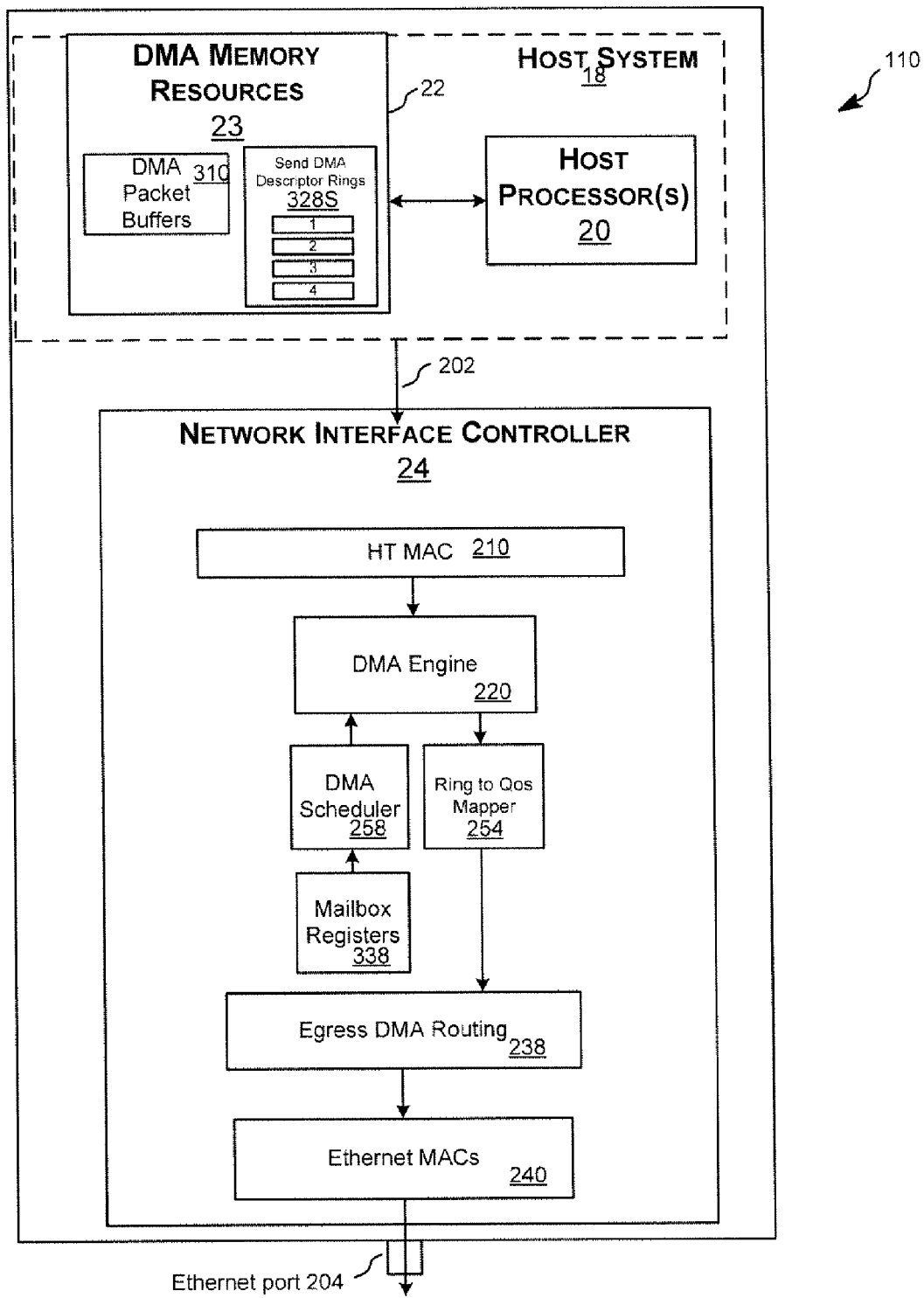
FIG. 2B is a block diagram of a network interface controller and host system that performs a send DMA operation using multiple DMA channels to extend host based QoS to network based QoS in the exemplary network environment.

As shown in FIGS. 2A and 2B, DMA operations between the host system 18 and the network interface controller 24 are organized into DMA channels under control of a DMA packet engine, such as a packet DMA engine 220 (interchangeably referred to as a DMA engine 220). DMA packet engine couples to CPU bus 208 via a CPU bus MAC interface, for example, a HT MAC 210 shown in FIGS. 2A and 2B. A DMA channel is comprised of a set of data structures, some of which reside in host memory 22 that includes computer readable medium and instructions that are thereupon stored which when executed by at least one processor, causes the processor to perform steps of FIGS. 3A and 3B, and some of which reside in the network interface controller 24. By employing multiple packet DMA engines with multiple rings, network quality of service can be extended from peripheral I/O devices on the network 112 and/or LAN 114 to the host's DMA system.

Referring now to FIG. 2A, an example application delivery controller 110 including the network interface controller 24 is shown that may be used in the network system 100 depicted in FIG. 1A to control multiple DMA channels for implementing network quality of service and for performing other functions. In this example, the network interface controller 24 is implemented in a Field-programmable gate array (FPGA), although other specialized hardware could be used, such as application-specific integrated circuits (ASICs). Generally, the network interface controller 24 is used to bridge network data traffic between a host processor complex and one or more high speed input/output (I/O) devices.

In the example shown in FIG. 2A, application delivery controller 110 receives network data packets from a network, such as network 112 shown in FIG. 1A. A return DMA operation is performed when the network interface controller 24 uses a DMA channel to move a block of data from a network interface controller peripheral into host memory 22. In this example, the network interface controller 24 connects to a host processor complex, such as host system 18, over CPU bus 202. I/O devices are attached to the network interface controller 24 with interfaces appropriate to each such device. One such device can be an Ethernet port 204 coupled to an Ethernet connection that in this example can be a 10 Gigabit Ethernet connection. The Ethernet port 204 can provide communication with the network 112 as shown in FIG. 1A. The network interface controller 24 provides DMA services to the host system 18 on behalf of its attached I/O devices. DMA services are provided through one or more DMA channels. Each DMA channel supports the movement of data traffic between the I/O devices and the host memory 22.

The example shown in FIG. 2A follows the flow of a received network data packet as it arrives at the application delivery controller 110. The network data packet arrives at Ethernet port 204. As further shown in FIG. 2A, the network interface controller 24 includes an Ethernet media access control (MAC) 240 and other peripheral interfaces (not shown separately). The Ethernet MAC 240 in this example is coupled to the Ethernet port 204 to receive packets from the network 112 as shown in FIG. 1A.

In one example, network interface controller 24 further includes a QoS to Ring Mapper 252. The QoS to Ring Mapper 252 extends network quality-of-service (QoS) all the way from the network 112 to a CPU complex associated with host processor 20. QoS to Ring Mapper 252 maps the received network data packet to a ring and carries the QoS from the network 112 to the host system 18 through network interface controller 24. In the following examples, quality of service (QoS) and class of service (CoS) are used interchangeably.

QoS to Ring Mapper 252 inspects each packet to determine its HiGig Destination Port and class of service (CoS) level. The destination port is used as an index into a mapping table to determine which DMA channel should receive the packet. In this example, a table can contain an entry for each of the 32 possible HiGig port values.

QoS to Ring Mapper 252 selects a DMA channel and selects a return DMA ring (e.g., return DMA descriptor ring 328R) based on QoS markings in the received data packet(s) and the peripheral port, such as Ethernet port 204. Once the DMA channel is determined, the CoS value in the packet is used to index into a ring mapping table. Each DMA channel as represented by the packet DMA engine 220 has a unique instance of the ring mapping table. Each ring mapping table contains an entry for each CoS value. The ring mapping table selects which DMA ring within the DMA channel should receive the packet.

Network interface controller 24 also includes packet buffers 256. Packet buffers 256 serve as a queue from which a DMA scheduler 258 chooses packets to go to the packet DMA engine 220. Packet DMA engine 220 monitors the applicable levels in the packet buffers 256 to determine when a return DMA operation should be initiated. The packet buffers 256 are ring-specific. That is, when the QoS to Ring Mapper 252 identifies the DMA channel and DMA ring to which the packets will be sent based on the QoS markings in the packet, the specific packet buffer 256 and packet DMA engine 220 are identified.

The packet buffers 256 can receive their own programmable minimum and maximum addresses that determine the packet buffer size. Programmable packet buffer size allows RAM storage to be shifted to match the anticipated requirements of traffic destined for each packet buffer (e.g., individual buffers/registers 1-4 within packet buffers 256). Unused packet buffers can be squeezed down to nothing, and all the RAM space can be allocated to actively used packet buffers. For example, packet buffers receiving low priority, high bandwidth, and delay tolerant traffic can be made very large. Further by way of example, packet buffers receiving high priority, low bandwidth, and delay sensitive traffic can be made small.

DMA scheduler 258 chooses packets out of packet buffers 256 based upon the priority of the queued network data packets and schedules the transfer to the appropriate packet DMA engine 220. For clarity and brevity, only a single packet buffer, a single DMA scheduler, and DMA engine are shown in FIG. 2A, but it should be understood that additional packet buffers, DMA schedulers, and DMA engines can be included in network interface controller 24.

The packet buffers 256 are selected based on a strict priority scheduling scheme using DMA scheduler 258. The DMA scheduler 258 selects which descriptor ring 1-4 out of return DMA descriptor rings 328R (also referred to as return DMA rings, or send rings) within DMA memory resources 23 to service and the matching packet buffer 256 is accessed for a single packet. The scheduling process is then repeated for the next packet.

Each network packet retrieved from a packet buffer 256 is routed to the appropriate DMA channel controlled by the respective packet DMA engine such as the packet DMA engine 220 in FIG. 2A. The DMA channel segments the network packet for delivery to host memory 22 via several, smaller, HyperTransport packets. These HyperTransport packets are interleaved with HyperTransport packets from the other DMA channels in the network interface controller 24.

For host bound packets, the network packets can be parsed and stripped of a HiGig header, the IP and TCP/UDP checksums can be checked, and the packet's length can be determined. Packet data is forwarded to the appropriate packet DMA engine 220 along with additional packet control information. The packet control information is used by the selected packet DMA engine within DMA engine 220 to fill out packet specific fields in a DMA return descriptor in descriptor rings 1-4 of return DMA descriptor rings 328R.

In one example, the network interface controller 24 supports four DMA channels and therefore there are four packet DMA engines each of which is the same as DMA engine 220. Each packet DMA engine can be a HyperTransport master and can initiate HyperTransport read and write transactions. The packet DMA engines perform the DMA operations required to move network packets between the attached I/O peripherals and host memory 22. DMA operations can be handled separately for the send (from host) and return (to host) directions.

For the host system 18 to receive a packet, a packet DMA engine such as the packet DMA engine 220 has an available producer descriptor, and a received packet is queued in the packet DMA engine 220. A producer descriptor describes an empty DMA packet buffer 310 in host memory 22. The packet DMA engine 220 pre-fetches producer descriptors from the host system 18 and holds them in a local cache (not shown). The producer descriptors are managed in part by entries in a host status block 308.

The host system 18 monitors the progress of the DMA operations performed by the packet DMA engine 220 via the host status block 308. Each packet DMA engine supports a host status block, such as the host status block 308 associated with the packet DMA engine 220. The host status block 308 contains ring status information for the return DMA descriptor rings 328R associated with the packet DMA engine 220. The host status block 308, in effect, tells the host processor 20 that there are data packets in the return DMA descriptor rings 328R. The host status block 308 can be a data structure in host memory 22 or a physical register or the like, and it is periodically updated by the packet DMA engine 220. The periodicity of these updates is determined by a host coalescing function. Host coalescing is controlled by a programmable set of activity counters and timers.

Packet data information is written to the return DMA descriptor rings 328R and the packet data is written into the DMA packet buffers 310 in host memory 22. The host processor 20, which is monitoring the host status block 308, notices a value change in the host status block 308. Detecting the changed condition, the host processor 20 continues the return DMA operation. The host processor 20 retrieves the DMA descriptor from the return DMA descriptor rings 328R. The DMA descriptor in the return DMA descriptor rings 328R points to the return data buffer and holds other information about the return data. The host processor 20 determines the order in which to service multiple return DMA descriptor rings 328R with pending descriptors, and the host processes the return data. The host processor 20 determines what to do with the network data packet.

During the data DMA, the packet data is mapped into one or more HyperTransport write transactions. When the data DMA operation is complete, the packet DMA engine 220 creates a return descriptor, writes it into the return DMA descriptor rings 328R in host memory 22, and notifies the host system 18. The return descriptor defines the specifics of the return DMA operation. In one example, multiple packet engines similar to DMA engine 220 support multiple return DMA descriptor rings 328R, allowing network quality of service disciplines to be extended into the host's DMA system during receipt of a network data packet from the network.

DMA services are provided through one or more DMA channels used by packet DMA engine 220. An example network interface controller 24 has four different DMA channels, each supporting the movement of data traffic between the I/O devices and the host's main memory 22.

Each DMA channel in the network interface controller 24 operates independently and is composed of its own private data structures. DMA channels can be assigned to individual host CPUs and/or software threads. By providing independent DMA services to individual software threads, the network interface controller 24 allows for the scaling of system performance when used with multi-core host CPU systems. The isolation created by separate, non-shared, DMA channels also enhances the system's resiliency and redundancy capabilities. Each application on the host system 18 can attach to a DMA channel as its own private application delivery controller device or network interface controller device.

Further, each DMA channel in the network interface controller 24 can have four quality of service rings, although a higher or a lower number of quality of service rings may be used. These individual rings can be associated with network quality of service levels. Packets can be mapped to the DMA rings based on the one or more Class of Service (CoS) fields/identifiers found in a HiGig header in each packet. The multiple DMA rings allow the network interface controller 24 to coherently extend network based quality of service to host based quality of service.

Example Transmitting Data Packets to the Network (Send DMA Operation)

FIG. 2B illustrates the DMA processes used by network interface controller 24 for using multiple DMA channels and multiple quality of service rings for DMA channels to optimize network traffic.

As illustrated in FIG. 2B, the host system 18 can send a network data packet stored in host memory 22 to the network 112 via network interface controller 24 and Ethernet port 204. A send DMA operation is performed when the host uses a DMA channel to move a block of data from host memory 22 to a network interface controller peripheral (not shown) via network 112. To perform a send DMA operation, the host processor 20 places the target network data packet into DMA packet buffer 310 and creates a DMA send descriptor (not shown separately) in send DMA descriptor rings 328S. The DMA send descriptor is jointly managed by the host system 18 and the network interface controller 24. The DMA send descriptor includes an address field and length field. The address field points to the start of the target network data packet in DMA packet buffer 310. The length field declares how many bytes of target data are present in the DMA packet buffer 310. The DMA send descriptor also has a set of bit flags (not shown) used to signal additional target data control and status information. By way of example only, return DMA descriptor rings 328R and send DMA descriptor rings 328S can be physically same hardware memory blocks functioning as return and send DMA rings, respectively, at different times. Alternatively, separate and distinct memory blocks within host memory 22's DMA memory resources 23 may be reserved for each return DMA descriptor rings 328R and send DMA descriptor rings 328S, as can be contemplated by those of ordinary skill in the art after reading this disclosure.

Host system 18 places the send descriptor on the send DMA descriptor rings 328S in host system memory 22. The host processor 20 determines the QoS of the network packet to be transferred to the network 112 and moves the network packet to the appropriate DMA packet buffer 310 and places the descriptor on the appropriate descriptor rings 1-4 in send DMA descriptor rings 328S. The descriptor ring in send DMA descriptor rings 328S chosen by the host system 18 selects the DMA channel, its associated peripheral, and the QoS level within the DMA channel. Send descriptors created by host system 18 in send DMA descriptor rings 328S can be of variable types, where each descriptor type can have a different format and size. The send DMA descriptor rings 328S is capable of holding descriptors of variable type.

The host processor 20 writes one or more mailbox registers 338 of the network interface controller 24 to notify the network interface controller 24 that the packet is ready. In performing this notification, the host processor 20 performs a write operation to a memory mapped network interface controller register (mailbox register 338). The host processor 20 can report the addition of multiple descriptors onto the send DMA ring in a single update, or alternatively, in multiple updates.

The appropriate packet DMA engine within DMA engine 220 is notified that the packet is ready. The packet DMA engine 220 can be selected from available DMA channels, or if a specific application has a dedicated DMA channel, the associated packet DMA engine 220 for that channel is used. The DMA engine 220 retrieves the DMA descriptor from the send DMA descriptor rings 328S. When multiple descriptors are outstanding in the send DMA descriptor rings 328S, the DMA Engine 220 may retrieve more than one descriptor. Retrieving multiple descriptors at a time maximizes bus bandwidth and hardware efficiency. The DMA engine 220 is capable of receiving and processing send descriptors of variable type, format, and size.

As outlined above, the packet DMA engine 220 monitors the progress of the host DMA operations via a set of mailbox registers 338. Each packet DMA engine 220 supports its own set of mailbox registers 338. The mailbox registers 338 reside in a mapped address space of the network interface controller 24. When appropriate, the host processor 20 accesses the mailbox registers 338 by performing memory mapped read and write transactions to the appropriate target address. The mailbox registers 338 also contain ring status information for the Ring to QoS Mapper 254.

In this send DMA example, the packet DMA engine 220 reads the send descriptor, performs the DMA operation defined by it, and reports to the host system 18 that the DMA operation is complete. During the DMA operation, data is received from one or more CPU Bus read transactions (e.g., HyperTransport or PCI Express read transactions).

Ring to QoS Mapper 254 examines the assigned send DMA ring in send DMA descriptor rings 328S and receives packet data and packet control information from the packet DMA engine 220. Using the control information, the Ring to QoS Mapper 254 stamps the appropriate QoS onto the network data packet, thereby allowing host system 18 to send the network data packet back to the network 112. For example, using the control information, the Ring to QoS Mapper 254 can create and prepend a HiGig header to the packet data.

An egress DMA routing interface 238 arbitrates access to the network for DMA send packets. When a Ring to Qos Mapper 254 has a network packet ready to send, the egress DMA routing interface 238 arbitrates its access to the Ethernet port 204 and routes the packet to the correct interface if there is more than one present in the network interface controller 24. The egress DMA routing interface 238 behaves like a crossbar switch and monitors its attached interfaces for available packets. When a packet becomes available, the egress DMA routing interface 238 reads the packet from the selected ring to QoS mapper 254 and writes it to the destination interface. The egress DMA routing interface 238 moves complete packets to Ethernet MACs 240. When multiple sources are contending for egress DMA routing interface 238, the egress DMA routing interface 238 uses a fair round-robin arbitration scheme based on last packet transmission, although other arbitration schemes, for example, a weighted round-robin, may be used. According to one example, the arbitration scheme implemented by egress DMA routing interface 238 is fair on a per packet basis, not on a byte basis.

The network interface controller 24 provides DMA services to a host complex such as the host system 18 in FIGS. 2A and 2B on behalf of its attached I/O devices such as the Ethernet port 204. DMA operations involve the movement of data between the host memory 22 and the network interface controller 24. The network interface controller 24 creates and manages HyperTransport or other types of CPU Bus read/write transactions targeting host memory 22. Data transfer sizes supported by DMA channels maintained by various components of application delivery controller 110 are much larger than the maximum HyperTransport or CPU bus transaction size. The network interface controller 24 segments single DMA operations into multiple smaller CPU Bus or HyperTransport transactions. Additionally, the network interface controller 24 creates additional CPU bus or HyperTransport transactions to support the transfer of data structures between the network interface controller 24 and host memory 22.

In one example, multiple packet DMA engines similar to packet DMA engine 220 support multiple send DMA descriptor rings 328S, allowing network quality of service disciplines to be extended from the host system 18's DMA system through to the peripheral I/O devices attached to or on the network 112.

In both return and send operations, multiple DMA rings (e.g., send DMA descriptor rings 328S and return DMA descriptor rings 328R) allow the network interface controller 24 to coherently extend network based quality of service to host based quality of service. Extending the quality of service involves a number of processes in the network interface controller 24.

One example process is a packet to DMA ring mapping. Packet to DMA ring mapping occurs in both receiving and transmitting packets to/from the host system 18. In the case of receiving network data packets from a network and routing them to the host system 18, the received packets are inspected by the QoS to Ring Mapper 252 in the network interface controller 24. A class of service (CoS) field is present in a HiGig header in each field of the received network data packet. The CoS field is used to select a DMA return ring in return DMA descriptor rings 328R, such as those associated with packet DMA engine 220 in FIG. 2A.

In the case of transmitting network data packets from the host system 18 out to network 112, the transmitted packets from the host system 18 are placed in a send DMA descriptor rings 328S such as one of the send DMA rings 1-4 in FIG. 2B. The CoS value assigned to the send DMA ring transmitting the packet is then stamped into the CoS field of the HiGig header of the packet.

Another example process that occurs involves buffering of received data packets. Received packets are buffered based on the assigned return DMA ring within return DMA descriptor rings 328R. Since the return DMA rings are assigned based on network quality of service settings, the buffering is quality of service based. Packet dropping occurs when a packet buffer 1-4 within DMA packet buffers 256 overflows and is limited to the overflowing buffer. Other buffers and quality of service levels are unaffected by such an overflow.

An additional example process that takes place includes servicing the send and return DMA rings. The send and return DMA rings are serviced by a packet DMA engine such as the packet DMA engine 220 using a strict priority scheduling discipline. At the end of each send DMA operation, the highest priority send DMA ring with outstanding descriptors is selected for the next DMA operation. Similarly, at the end of each return DMA operation, the highest priority return DMA ring with outstanding packets in a receive buffer is selected for the next DMA operation. This scheduling allows higher priority traffic to be preferentially transmitted and received even when lower priority traffic is pending. Of course, other scheduling disciplines such as a weighted round robin could also be used.

In this fashion, important network data packets, that is, those with the higher QoS markings, will get through the network interface controller 24 and generally, the network system 100, more quickly than those network data packets with lower priority QoS markings.

Figure 3A:
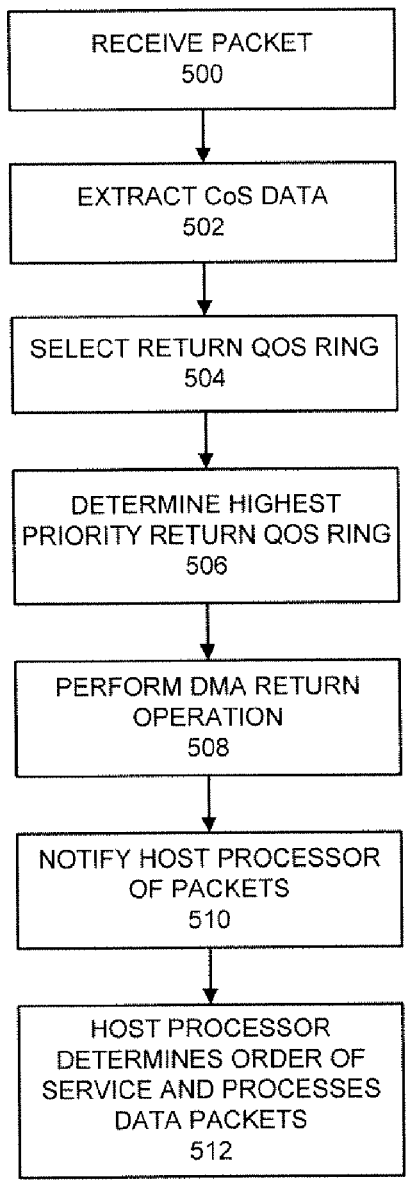
FIG. 3A is a flow chart of methods for performing a return DMA operation using multiple DMA channels shown in FIG. 2A.

The operation of an example of use of multiple DMA channels with multiple quality of service rings shown in FIGS. 2A-2B, which can be run on network traffic management devices, for example, the application delivery controller 110 or other types similar of network traffic management devices, will now be described with reference to FIGS. 2A-2B in conjunction with the flow diagrams shown in FIGS. 3A-3B. By employing multiple packet DMA engines with multiple DMA rings, network quality of service can be extended from peripheral I/O devices on the network to the host's DMA system.

As shown in block 500 in FIG. 3A, a packet can be initially received from the network 112 by the network interface controller 24 of application delivery controller 110 via the Ethernet port 204 in FIG. 2A, although the packet may alternatively be initially received from LAN 114 and handled in the same manner as the packet received from network 112 described below. In this example, the received packets can be in a TCP format with a header and a payload. The header includes a class of service field in a HiGig header. In block 502, the received packet is inspected and the HiGig header is extracted from the packet and the class of service data in the class of service field is read, in addition to other packet information. In block 504, the QoS to Ring Mapper 252 in FIG. 2A then selects one of the return DMA rings 1-4 in return DMA descriptor rings 328R and packet buffers 256 to store the packet for DMA processing based on the data in the class of service field. Thereby, the application delivery controller 110 performs classifying the inspected packet based on one or more class of service identifiers in the packet, and assigns the classified packet to one of a plurality of DMA rings (e.g., return DMA descriptor rings 328R) associated with a DMA channel based on the one or more class of service fields/identifiers in the packet.

In block 506, DMA Scheduler 258 determines the highest priority return ring and facilitates the transfer of the packet with packet DMA engine 220. The determination of the priority includes servicing the plurality of DMA rings (e.g., return DMA descriptor rings 328R) using a priority discipline, and selecting a DMA ring out of return DMA rings 1-4 in return DMA descriptor rings 328R with a highest class of service based upon the priority discipline for the servicing. As described earlier, the packet may be stored in a receive buffer, for example, in packet buffers 256.

In block 508, packet DMA engine 220 performs the DMA return operation to move the network packet to DMA memory resources 23 in host system 18 shown in FIG. 2A. In block 510, packet DMA engine 220 notifies the host processor 20 that there are data packets in the return DMA descriptor rings 328R by updating the host status block 308.

In block 512, host processor 20 determines the order in which to service the return DMA rings (e.g., DMA rings in return DMA descriptor rings 328R) and processes the return data packets. The host processor 20 also determines what to do with the data packet.

A similar process is used to maintain quality of service as a DMA send operation is performed and the network data packet moves from the host system 18 to I/O device 30 on the network 112 via network interface controller 24.

Figure 3B:
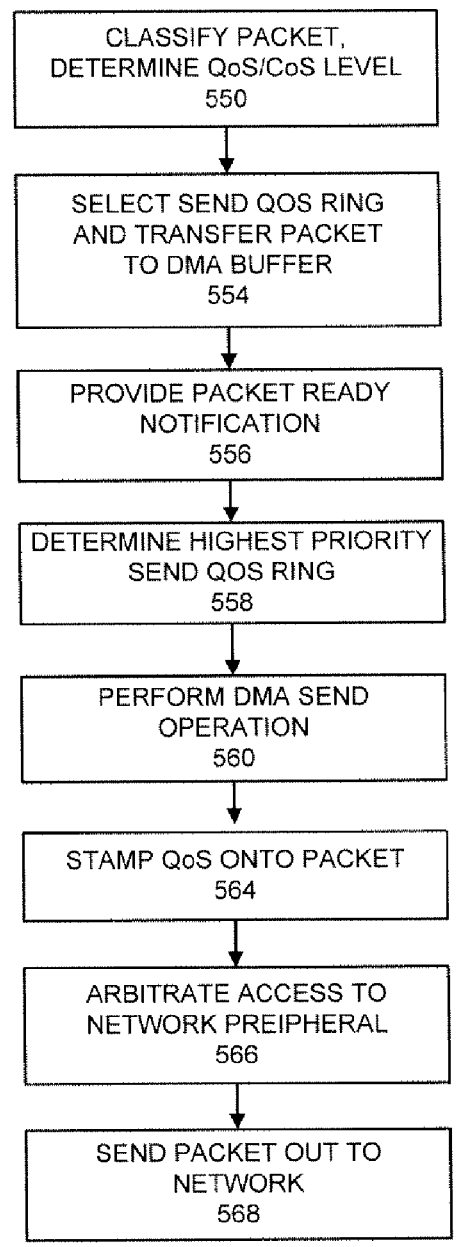
FIG. 3B is a flow chart of methods for performing a send DMA operation using multiple DMA channels shown in FIG. 2B.

Referring now to FIG. 3B, in block 550, a network data packet to be sent to the network 112 is assigned a class of service value in a class of service field/identifier in the packet header by the host processor 20. In block 554, the host processor 20 moves the network data packet to the DMA packet buffer 310. The host processor 20 also places a send descriptor associated with the packet in the send DMA descriptor rings 328S (also referred to as "send DMA ring") consistent with the identified class of service level of the packet. The network data packet is then stored in the DMA packet buffers 310 for transmission.

In block 556, host processor 20 writes to mailbox registers 338 to notify the packet DMA engine 220 in the network interface controller 24 that the packet is ready. The DMA scheduler 258 determines the highest priority send DMA ring in block 558 and notifies packet DMA engine 220. The packet DMA engine 220 then takes the next packet in the selected send DMA ring and performs the DMA send operation in block 560. Similar to the receive scenario described above in FIG. 3A, the determination of the highest priority of network packet to be transmitted includes servicing the plurality of DMA rings (e.g., send DMA descriptor rings 328S) using a priority discipline, and selecting a DMA ring out of send DMA rings 1-4 in send DMA descriptor rings 328S with a highest class of service based upon the priority discipline for the servicing.

In block 564, the Ring to QoS Mapper 254 receives packet data and control information and stamps the appropriate QoS onto the network data packet. In block 566, egress DMA routing interface 238 arbitrates the order in which the packets are forwarded to the network 112 via Ethernet MACs 240 and subsequently Ethernet port 204, and routes the packet based upon the packet DMA engine 220 with which the packet is associated. In block 568, the packets are sent out to the network 112 through Ethernet MACs 240.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. For example, more or less than four DMA channels can be used. The DMA channel structure can be applied to other CPU bus types including PCI, PCI-X and PCI Express. Further, other packet fields can be used for quality of service classification other than CoS data. These other packet fields can include VLAN tag priority bits or the IP header TOS bits. The order that the measures and processes are implemented can also be altered. Furthermore, multiple networks in addition to network 112 and LAN 114 could be associated with application delivery controller 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for handling packets received from a server over a network based upon quality of network service on DMA channels, the method comprising:

determining by a network traffic management device one or more class of service identifiers associated with one or more obtained packets;

storing by the network traffic management device the one or more obtained packets in one or more DMA packet buffers;

assigning by the network traffic management device a DMA return descriptor associated with each of the one or more obtained packets stored in the one or more DMA packet buffers to one of a plurality of DMA rings associated with a plurality of DMA channels based on the one or more class of service identifiers determined for each of the one or more obtained packets, wherein the DMA return descriptor defines one or more return DMA operations; and processing by the network traffic management device each of the one or more obtained packets using the plurality of DMA channels according to a priority associated with each of the plurality of DMA rings.

2. The method of claim 1 further comprising:
storing by the network traffic management device the one or more obtained packets in one of a plurality of packet buffers based on the determined one or more class of service identifiers,
wherein the storing by the network traffic management device the one or more obtained packets in the one of a plurality of packet buffers further comprises transferring by the network traffic management device the one or more obtained packets from the plurality of packet buffers to one of the plurality of DMA packet buffers according to a priority associated with each of the plurality of packet buffers.

3. The method of claim 1 further comprising:
prioritizing by the network traffic management device performance of a DMA operation in the plurality of DMA channels for the assigned DMA return descriptor stored in one of the plurality of DMA rings.

4. The method of claim 1, wherein the processing further comprises:
servicing the plurality of DMA rings using a priority discipline,
wherein the priority discipline includes at least one of selecting one of the plurality of DMA rings with a highest associated class of service or a weighted round-robin scheduling discipline.

5. The method of claim 1, wherein the processing further comprises retrieving with the network traffic management device each of the DMA return descriptors according to a priority associated with each of the plurality of DMA rings.

6. The method of claim 1, wherein each of the plurality of DMA rings corresponds to a priority for servicing network traffic and a higher priority DMA ring of the plurality of DMA rings performs a DMA operation prior to lower priority DMA rings of the plurality of DMA rings.

7. A non-transitory computer readable medium having stored thereon instructions for handling packets received from a server over a network based upon quality of network service on DMA channels, which when executed by at least one processor, causes the processor to perform steps comprising:
determining one or more class of service identifiers associated with one or more obtained packets;
storing the one or more obtained packets in one or more DMA packet buffers;
assigning a DMA return descriptor associated with each of the one or more obtained packets stored in the one or more DMA packet buffers to one of a plurality of DMA rings associated with a plurality of DMA channels based on the one or more class of service identifiers determined for each of the one or more obtained packets, wherein the DMA return descriptor defines one or more return DMA operations; and processing each of the one or more obtained packets using the plurality of DMA channels according to a priority associated with each of the plurality of DMA rings.

8. The medium of claim 7 further comprising:
storing the one or more obtained packets in one of a plurality of packet buffers based on the determined one or more class of service identifiers,
wherein the storing the one or more obtained packets in the one of a plurality of packet buffers further comprises transferring by the network traffic management device the one or more obtained packets from the plurality of packet buffers to one of the plurality of DMA packet buffers according to a priority associated with each of the plurality packet buffers.

9. The medium of claim 7 further comprising:
prioritizing performance of a DMA operation in the plurality of DMA channels for the assigned DMA return descriptor stored in one of the plurality of DMA rings.

10. The medium of claim 9 wherein the processing further comprises:
servicing the plurality of DMA rings using a priority discipline,
wherein the priority discipline includes at least one of selecting one of the plurality of DMA rings with a highest associated class of service or a weighted round-robin scheduling discipline.

11. The medium of claim 7, wherein the processing further comprises retrieving with the network traffic management device each of the DMA return descriptors according to a priority associated with each of the plurality of DMA rings.

12. The medium of claim 7, wherein each of the plurality of DMA rings corresponds to a priority for servicing network traffic and a higher priority DMA ring of the plurality of DMA rings performs a DMA operation prior to lower priority DMA rings of the plurality of DMA rings.

13. A network traffic management device comprising:
one or more processors;
a memory, wherein the memory is coupled to the one or more processors which are configured to execute programmed instructions stored in the memory comprising:
determining one or more class of service identifiers associated with one or more obtained packets;
storing the one or more obtained packets in one or more DMA packet buffers;
assigning a DMA return descriptor associated with each of the one or more obtained packets stored in the one or more DMA packet buffers to one of a plurality of DMA rings associated with a plurality of DMA channels based on the one or more class of service identifiers determined for each of the one or more obtained packets, wherein the DMA return descriptor defines one or more return DMA operations; and
processing each of the one or more obtained packets using the plurality of DMA channels according to a priority associated with each of the plurality of DMA rings.

14. The device of claim 13, wherein the one or more processors coupled to the memory are further configured to execute programmed instructions stored in the memory further comprising:
storing the one or more obtained packets in one of a plurality of packet buffers based on the determined one or more class of service identifiers,
wherein the storing the one or more obtained packets in the one of a plurality of packet buffers further comprises transferring by the network traffic management device the one or more obtained packets from the plurality of packet buffers to one of the plurality of DMA packet buffers according to a priority associated with each of the plurality packet buffers.

15. The device of claim 13, wherein the one or more processors coupled to the memory are further configured to execute programmed instructions stored in the memory further comprising:
prioritizing performance of a DMA operation in the plurality of DMA channels for the assigned DMA return descriptor stored in one of the plurality of DMA rings.

16. The device of claim 13, wherein the processing further comprises:
servicing the plurality of DMA rings using a priority discipline,
wherein the priority discipline includes at least one of selecting one of the plurality of DMA rings with a highest associated class of service or a weighted round-robin scheduling discipline.

17. The device of claim 13, wherein the processing further comprises retrieving with the network traffic management device each of the DMA return descriptors according to a priority associated with each of the plurality of DMA rings.

18. The device of claim 13, wherein each of the plurality of DMA rings corresponds to a priority for servicing network traffic and a higher priority DMA ring of the plurality of DMA rings performs a DMA operation prior to lower priority DMA rings of the plurality of DMA rings.

* * * * *